United States Patent [19]
Kristensen

[11] Patent Number: 5,619,933
[45] Date of Patent: Apr. 15, 1997

[54] METHOD AND PLANT FOR PRODUCING HIGH STEAM TEMPERATURES WHEN BURNING PROBLEMATIC FUELS

[75] Inventor: Ole S. Kristensen, Kolding, Denmark

[73] Assignee: Ansaldo Volund A/S, Denmark

[21] Appl. No.: 403,793

[22] PCT Filed: Sep. 17, 1993

[86] PCT No.: PCT/DK93/00300

§ 371 Date: Apr. 17, 1995

§ 102(e) Date: Apr. 17, 1995

[87] PCT Pub. No.: WO94/07006

PCT Pub. Date: Mar. 31, 1994

[30] Foreign Application Priority Data

Sep. 17, 1992 [DK] Denmark ................ 1147/92

[51] Int. Cl.[6] .................................. F23B 7/00
[52] U.S. Cl. ............................. 110/234; 122/1 R
[58] Field of Search .................. 110/234, 203, 110/204, 254, 304, 343, 347; 122/4 D, 1 R

[56] References Cited

U.S. PATENT DOCUMENTS

| | | | |
|---|---|---|---|
| 3,148,665 | 8/1961 | Switzer, Jr. | 110/304 X |
| 4,085,593 | 4/1978 | Larsen. | |
| 4,099,382 | 7/1978 | Paull et al.. | |
| 4,223,640 | 9/1980 | Rochford et al. | 110/254 X |
| 4,953,479 | 9/1990 | Keller et al. | 110/234 X |

FOREIGN PATENT DOCUMENTS

| | | |
|---|---|---|
| 0128252 | 12/1984 | European Pat. Off.. |
| 402796 | 7/1978 | Sweden. |

Primary Examiner—Henry A. Bennett
Assistant Examiner—Susanne C. Tinker
Attorney, Agent, or Firm—Larson and Taylor

[57] ABSTRACT

When burning problematic fuels, the hot flue gas produced is held physically separate from the superheater (4) of the plant, a part of the hot flue gas being made to flow towards a heat exchanger (3), in which an energy carrier is heated and transfers the heat to the superheater (4). In this manner, problems due to high-temperature corrosion are avoided.

1 Claim, 3 Drawing Sheets

METHOD AND PLANT FOR PRODUCING HIGH STEAM TEMPERATURES WHEN BURNING PROBLEMATIC FUELS

TECHNICAL FIELD

The present invention relates to a method for producing high steam temperatures when burning fuels, said method being of the kind set forth in the preamble of claim 1.

BACKGROUND ART

When burning fuels like e.g. straw, wood and household refuse, the combustion process comprises the liberation of corrosive substances like sulphur, chlorine and alkali compounds. If the combustion occurs in connection with processes, in which the heat is utilized for producing steam, and in which the steam is subsequently to be superheated, e.g. for use in a steam turbine, the life span of the superheater depends in part on the content and concentration of corrosive substances in the flue gas, in part on the material, of which the superheater is manufactured, and the temperature of the material.

In a steam-producing plant, the superheater is normally an integral part of the total layout of the plant. The steam to be superheated flows under pressure in tubes made from metallic materials. The tubes are heated externally by the hot flue gases from the combustion process, and if the steam is to be used e.g. in a steam turbine for producing electric power, it is of decisive importance for the performance of the turbine that temperature and pressure are as high as possible, i.e. as high as permitted by the materials used.

With the methods known at present for using flue gas from chlorine-containing fuels, it is not possible to achieve steam data as good as the data achieved with chlorine-free fuels, without the process causing high-temperature corrosion, rapidly causing breakdown of the materials, of which the superheater is constructed. The literature in this field describes materials able to resist the aggressive attack from e.g. chlorine and alkali compounds, even at high temperatures. These materials are, however, extremely costly and can hardly be used at the high pressures occurring in a superheater.

It is known to be possible, by using several fuels in combination, to achieve improved steam data compared to what is possible when using one single problematic fuel. This is done by using the problematic fuel to produce steam at low temperatures, while the superheating towards higher temperatures takes place in an external superheater, in which the high temperature is produced by burning a problem-free fuel, such as natural gas.

Further, the literature describes the possibility of achieving superheating by means of pyrolysis gas produced from the problematic fuel at low temperatures, so that the corrosive substances, such as e.g. chlorine and alkali compounds, are retained in the pyrolysis equipment. This process step is, however, extremely complicated and expensive, and is hardly likely to find widespread use in commercial plants.

The document U.S. Pat. No. 4,099,382 discloses a method and a plant for producing superheated steam utilizing the heat from a partial oxidation process. The method concerned features the same steps as are set forth in the preamble of claim 1, and could be contemplated as being useful for burning fuels of the kind referred to above, i.e. straw, wood and household refuse, while avoiding the disadvantages of the other methods referred to above with regard to avoiding corrosion at a reasonable cost.

In the method of said U.S. Pat. No. 4,099,382, the hot flue gas flowing from the combustion site, in this particular case a gas generator producing heat by partial oxidation, flows firstly to a heat exchanger transferring heat to the superheater, upon leaving the heat exchanger flowing to a steam-generating gas cooler (i.e. a boiler) giving off the remainder of its heat to the latter.

This arrangement makes it difficult to control the transfer of heat from the combustion site to the steam generator and the superheater independently of each other, because the heat exchanger and the steam generator are virtually "series-connected" with regard to the flow of hot flue gas from the combustion site. When burning fuels of the kind referred to initially, that may be delivered to an incinerating plant in highly varying proportions of the various ingredients, it is highly important to be able to control the two heat flows independently of each other in order to optimalize the combustion process at all times.

DISCLOSURE OF THE INVENTION

It is the object of the present invention to provide a method of the kind referred to initially, in which the two heat flows mentioned above may be controlled independently of each other, and according to the present invention, this object is achieved in a method also comprising the features set forth in the characterizing clause of claim 1.

By proceeding in this manner, it is possible to control the operation of the steam generator, i.e. the boiler, and that of the heat exchanger, separately with a view to achieving optimum operating conditions at all times, inter alia making it possible to use a high-temperature heat exchanger made from materials capable of withstanding high temperatures and aggressive flue-gas mixtures, without making high demands on the physical strength of the materials, as with the fuels referred to above, the heat exchanger is preferably used at very low pressures.

BRIEF DESCRIPTION OF THE DRAWING

In the following detailed portion of the present description, the invention will be explained in more detail with reference to the drawing, in which FIGS. 1 and 2 in a purely diagrammatic manner show how the method according to the invention may be carried out.

DESCRIPTION OF THE PREFERRED EMBODIMENTS

The fuel is burned in a combustion space or fire box 1, that may be of the water-cooled or the brick-lined type. The hot flue gases are made to flow in part to a boiler 2, in part to a high-temperature heat exchanger 3. In the boiler 2, the hot flue gas from the fire box 1 is used for producing steam at a high pressure, the temperature being held at a low level in order to avoid high-temperature corrosion.

In the high-temperature heat exchanger 3, which is made from corrosion-resistant materials, such as e.g. ceramics, the hot flue gases are used to heat a problem-free energy carrier, that may e.g. be air. The energy carrier being heated in this manner is made to flow towards a superheater 4 that receives the steam from the boiler 2.

In the superheater 4, the steam is heated to high temperatures by means of the energy carrier, one such having being chosen that is not aggressive towards the materials used in the superheater 4. Typically, the superheater 4 is made from metallic materials able to withstand high pressures.

Figure 1:
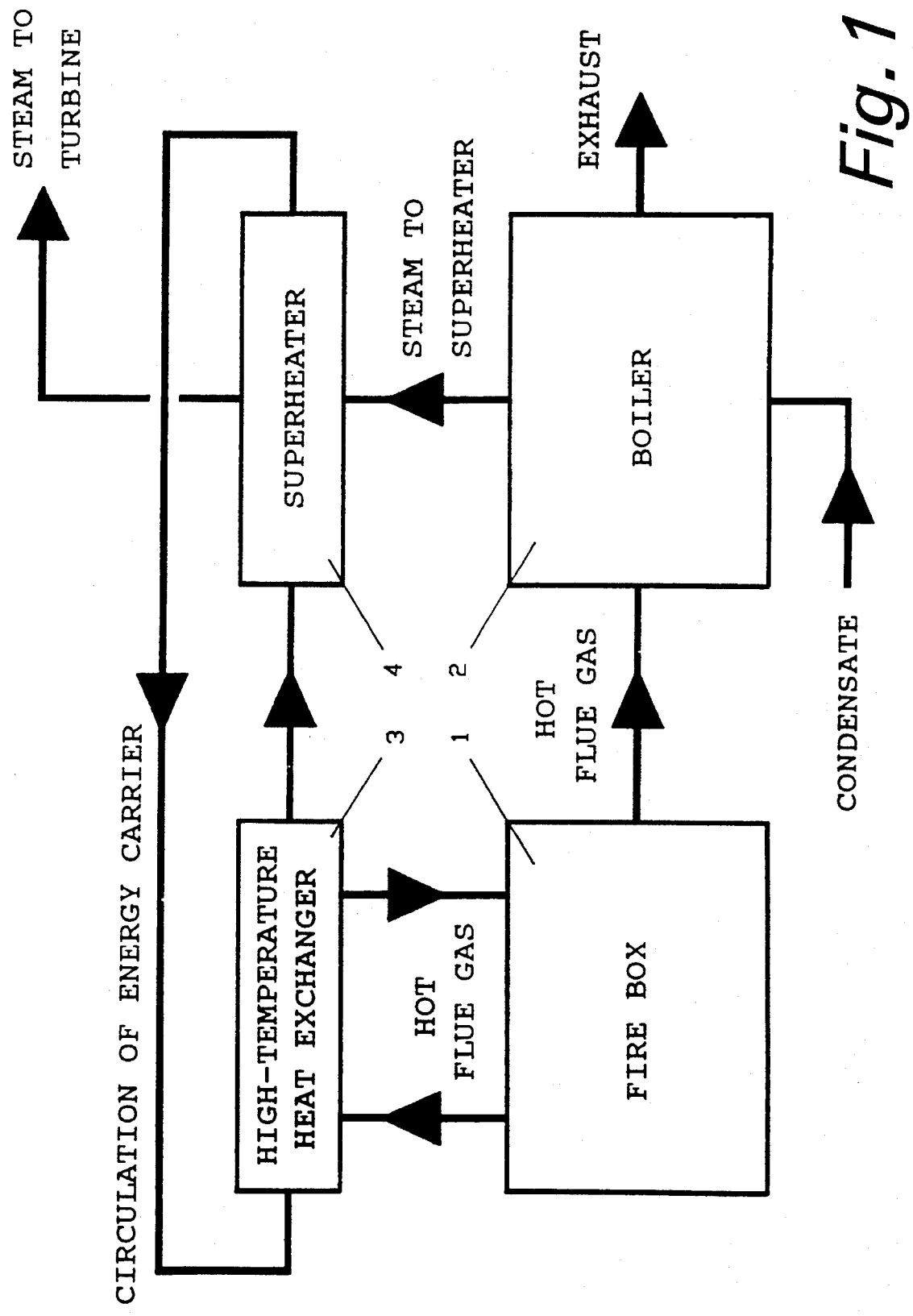
Figure 2:
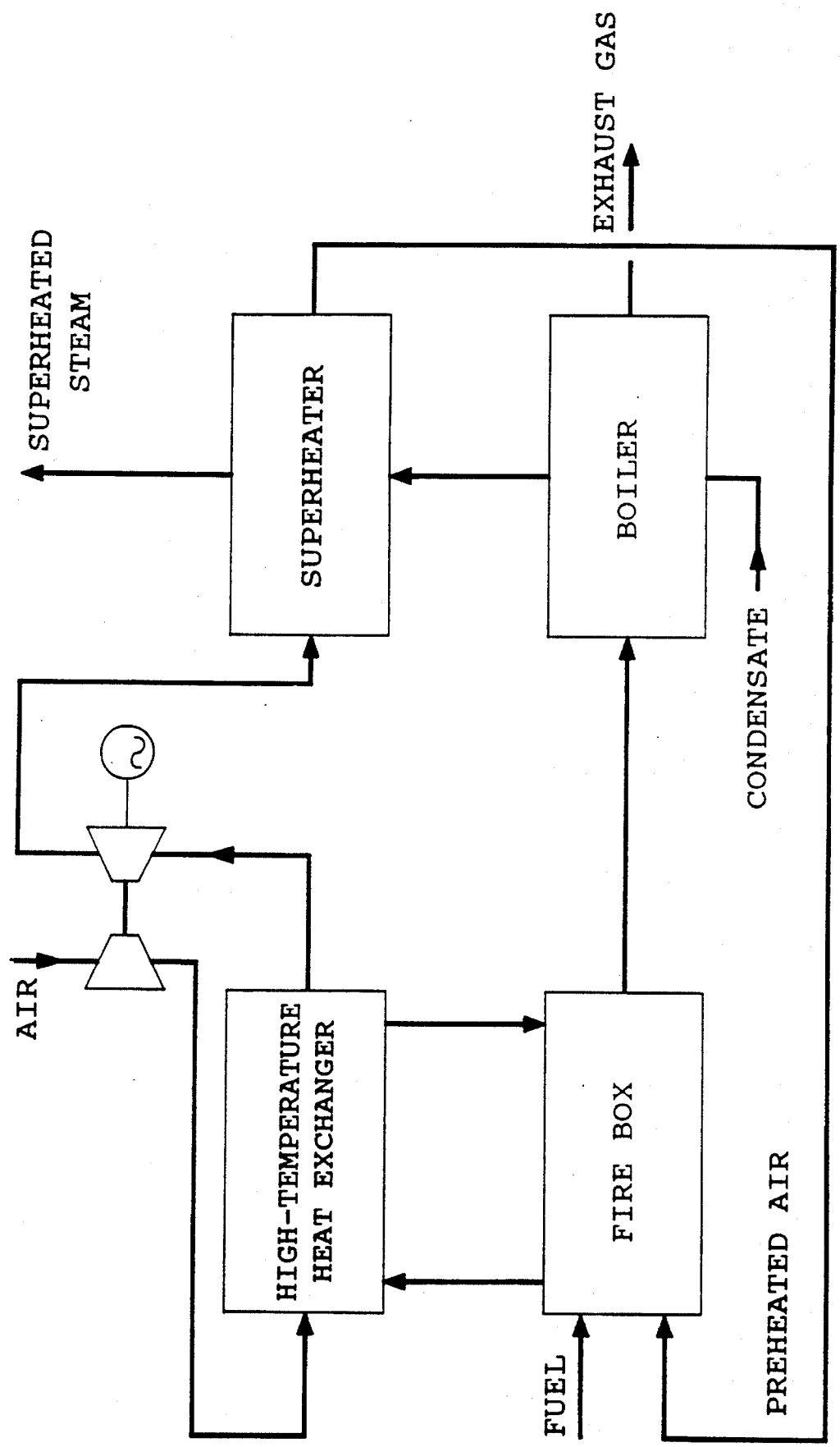
Figure 3:
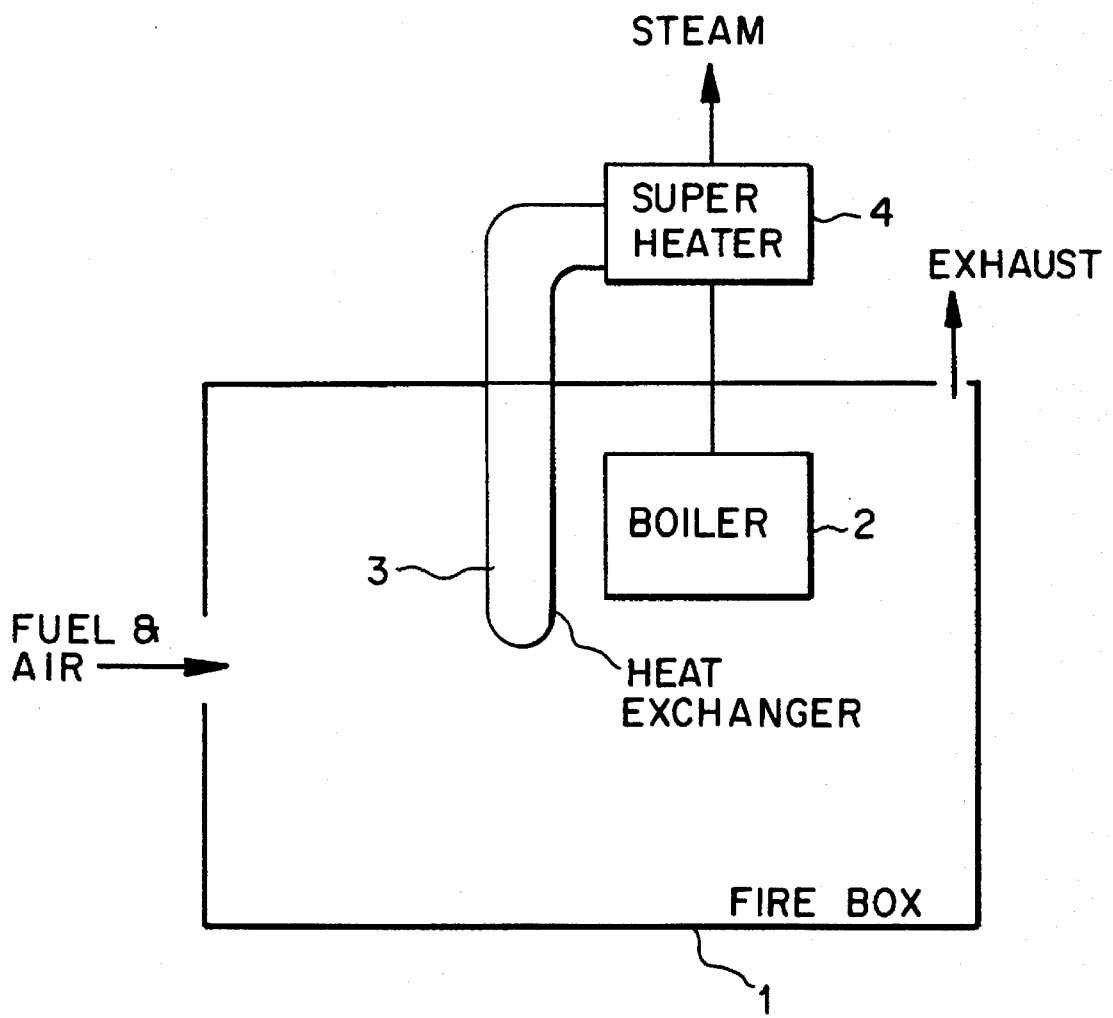
FIG. 3 is a simplified sketch of a waste-incineration plant embodying the principles of the invention.

The energy carrier may be made to circulate in a closed circuit to produce high temperatures and direct heat exchange as shown in FIGS. 1 and 3, or in an open system, possibly connected to a turbo charger or a gas turbine 5 as indicated in FIG. 2.

The high-temperature heat exchanger 3 can constitute a separate unit as shown in FIGS. 1 and 2, or it can be integrated with or in the fire box, as shown in FIG. 2.

As will be evident from the drawing, the flow of heat from the fire box 1 to the boiler 2 is separate from the flow of heat from the fire box 1 to the heat exchanger 3, making it possible, by using well-known means (not shown) to control these two flows independently of each other. With special reference to FIG. 3, it should be noted that the heat exchanger 3, although receiving a considerable amount of heat from the combustion taking place on the grate in the fire box 1 by convection and radiation, does not prevent such heat from reaching the boiler 2 in adequate amounts.

I claim:

1. Plant for producing high steam temperatures when burning fuels comprising:

a combustion space for producing hot flue gas, a boiler adapted to be heated by the hot flue gas from the combustion space and to deliver steam to an external superheater, a heat exchanger having a heat-receiving side which is adapted to be heated by radiation and by the hot flue gases from the combustion space, and a heat-delivering side which is adapted to supply heat to said external superheater through a separate heat-exchange medium, the heat exchanger being built into the combustion space, a first path for the transfer of heat from the combustion space to the boiler, and a second path for the transfer of heat directly from the combustion space to the heat exchanger.

* * * * *